United States Patent [19]
Heitmann

[11] 3,972,772
[45] Aug. 3, 1976

[54] STEAM POWER PLANT FOR NUCLEAR REACTOR STATIONS HAVING PRESSURIZED WATER REACTORS

[75] Inventor: Hans-Günter Heitmann, Erlangen-Buckenhof, Germany

[73] Assignee: Kraftwerk Union Aktiengesellschaft, Mulheim (Ruhr), Germany

[22] Filed: May 21, 1974

[21] Appl. No.: 471,844

Related U.S. Application Data

[63] Continuation of Ser. No. 273,192, July 19, 1972, abandoned.

[30] Foreign Application Priority Data

July 20, 1971 Germany............................ 2136185

[52] U.S. Cl................................ 176/37; 210/195 R
[51] Int. Cl.²............................................ G21C 19/30
[58] Field of Search...................... 176/37, 38, 87; 210/222, 195

[56] References Cited
UNITED STATES PATENTS

| | | | |
|---|---|---|---|
| 3,054,738 | 9/1962 | Hermans et al. | 176/37 |
| 3,113,913 | 12/1963 | Newton | 176/37 |
| 3,205,144 | 9/1965 | Jabsen | 176/87 |
| 3,365,367 | 1/1968 | Dolle | 176/37 |
| 3,378,450 | 4/1968 | Gramer et al. | 176/37 |
| 3,400,049 | 9/1968 | Wolfe | 176/37 |
| 3,539,509 | 11/1970 | Heitmann et al. | 210/222 |
| 3,575,294 | 4/1971 | Hirowetari et al. | 210/195 |
| 3,660,231 | 5/1972 | Fox et al. | 176/87 |

FOREIGN PATENTS OR APPLICATIONS

| | | | |
|---|---|---|---|
| 2,013,679 | 10/1971 | Germany | 176/37 |
| 98,962 | 11/1961 | Norway | 176/37 |

*Primary Examiner*—Harvey E. Behrend
*Attorney, Agent, or Firm*—Herbert L. Lerner

[57] ABSTRACT

In a nuclear power station having a pressurized water reactor, blowdown water which is produced in the steam generators due to an accumulation of existing impurities, is not discarded but is returned to the circulation system through an electromagnetic filter, in combination with a mixed bed filter.

2 Claims, 1 Drawing Figure

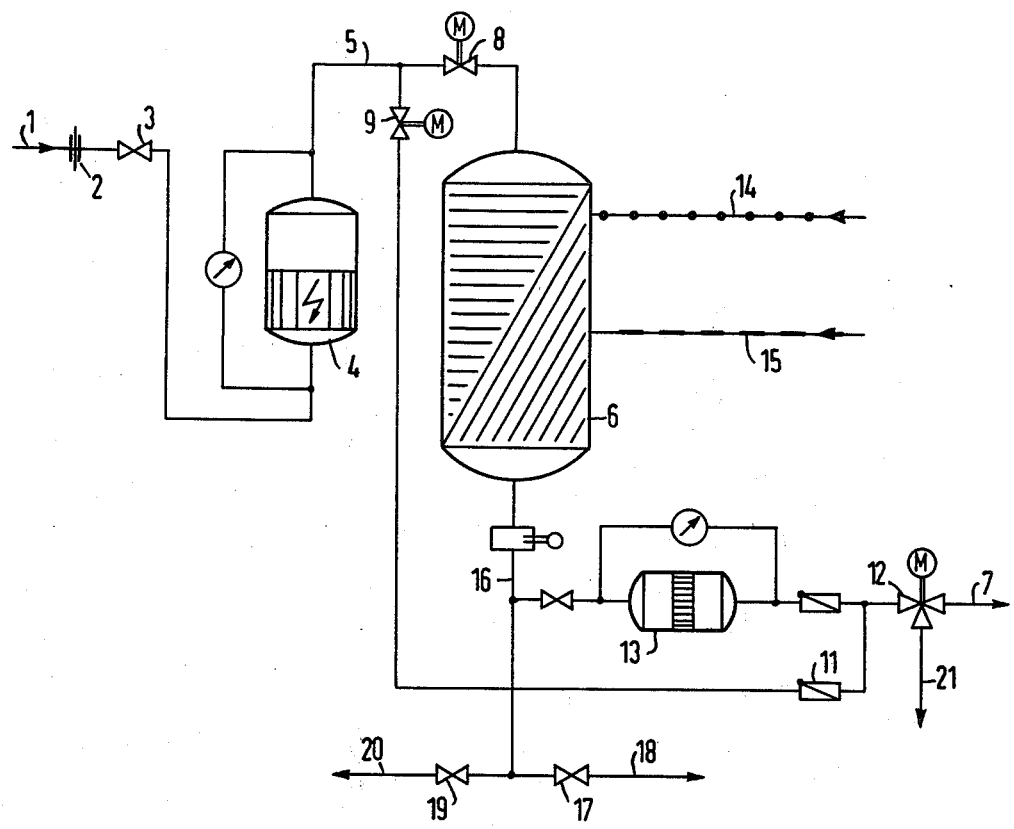

STEAM POWER PLANT FOR NUCLEAR REACTOR STATIONS HAVING PRESSURIZED WATER REACTORS

This is a continuation of application Ser. No. 273,192, filed July 19, 1972, now abandoned.

The invention of the instant application relates to a steam power plant for nuclear power stations having pressurized water reactors, wherein quantities of blowdown water, which are produced due to an accumulation of existing and continually developing impurities in the water circulation system, are to be removed. Generally the quantities of blowdown water used to be brought initially to a relatively low pressure in an expansion or blowdown tank, thereafter the blowdown was cooled to temperatures of 40°C, for example, through a brine cooler, and the blowdown would then be discarded. Considerable water losses can be produced thereby. Another disadvantage is that when there are leakages between the primary and the secondary circulatory systems, the blowdown water must be further treated in the purification or preparation plant for radioactive waste waters. If the capacity of the preparation plant is thereby exceeded, the power station must be shut-down.

It is accordingly an object of the invention to provide steam power plant for nuclear power stations having pressurized water reactors which avoids the foregoing disadvantages of the heretofore known plants of this general type.

With the foregoing and other objects in view, there is provided, in accordance with the invention, in steam power plant for nuclear power stations having pressurized water reactors and including a water circulation system from which quantities of blowdown water produced due to an accumulation of existing and continually developing impurities therein are removable through a blowdown line, a purifying device connected in the blowdown line and comprising an electromagnetic filter, a mixed bed filter connected thereto, and means for returning to the water circulation system at least part of the water contained in the quantities of blowdown water. If the blowdown water is now cleaned by the electro-magnetic filters or by filters, operating in a similar manner as well as by mixed bed or powdered resin filters, to such an extent that it is returnable to the circulatory system, the need for additional water will be considerably reduced. When leakages occur between the primary and the secondary cycle, the non-dissolved and dissolved activity carriers entrained thereby, can be removed from the water so that the operation of the plant can be maintained. Only the much smaller amounts of rinsing and regenerating waters that accumulate must be further treated in the preparation plant for radio-active waste waters.

Although the invention is illustrated and described herein as embodied in steam power plant for nuclear power stations having pressurized water reactors, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the single FIGURE of the drawing which is a schematic view of the blowdown water purifying device for the circulatory system of a steam power plant for a nuclear power station having a pressurized water reactor, in accordance with the invention.

Referring now to the drawing, blowdown water which is produced in the steam generators due to an accumulation of existing impurities conducted to a purifying device 4, 6 is from a non-illustrated blowdown tank as well as a brine cooler through a line 1, in which a measuring orifice 2 and a shut-off valve 3 are connected. The invention of this application is based on the realization that the impurities are formed mainly of iron oxides and salts, so that an electromagnetic precipitation or deposition device in combination with a mixed bed filter is considered basically to be adequate for effecting reclamation of the water. Accordingly, the blowdown is delivered to the electromagnetic filter 4 and emerges therefrom free of ferritic impurities, through line 5.

The electromagnetic filter 4 operates in the following manner. The quantities of water to be purified traverse a hollow space which is partly or nearly completely filled with hard-magnetic steel balls, a strong magnetization of the steel balls, preferably far exceeding the magnetic saturation, thereof being produced by relatively high excitation currents, so that the magnetizable impurities then adhere to the hard magnetic balls. From time to time, a rinsing or regeneration of the electromagnetic filter becomes necessary; during the rinsing process, chopped or intermittent direct current of decreasing and alternately opposing polarity, may be used for de-excitation of the filter and, at the same time, rinsing water can be supplied under such pressure and in such quantities that the steel balls are whirled upwardly and perform a dancing motion.

From the electromagnetic filter 4, the blowdown is passed through the line 5 to the mixed bed filter 6, the thus purified water being conducted through line 16 and 7 into the machine condenser or into the condensate line or string and thereby returned to the circulatory system of the power plant. If the water mainly contains oxidic impurities, the recycling can be effected by by-passing the mixed bed filter 6, with the shut-off valve 8 closed and the shut-off valve 9 open, through the by-pass 10, a relief valve 11 and a three-way valve 12, as well as through the line 7. On the other hand, ionogenic impurities are removed through the mixed bed filter 6, downstream of which a resin catcher or capturing device 13 is connectible for safety reasons.

The rinsing and regeneration of the electromagnetic filter 4 can be effected by means of the water brought in from the non-illustrated brine cooler through the line 1. The mixed bed filter 6 can be regenerated, as indicated diagrammatically by a line 14, with caustic soda solution and, furthermore, as indicated diagrammatically by a line 15, with hydrochloric acid or with sulfuric acid. The lines 14 and 15 are brought in from the water-preparation plant.

The rinsing and regenerating waters can be discharged to a non-illustrated neutralizing tank through line 18 from outlet line 16, when the valve 17 is opened. When leakages occur between the primary and the secondary circulatory systems, the discharge of these waters is effected through the line 20 to the waste water preparation installation by opening the valve 19. From the three-way valve 12, a line 21 leads to a main cooling water outlet (not shown).

I claim:
1. Filter system for the purification of blowdown water in steam power plants having nuclear reactors, comprising a blowdown water line, an electromagnetic filter having an inlet connected to said blowdown water line and having an outlet line, a mixed bed filter for ionogenic impurities connected to said outlet line of said electromagnetic filter, a by-pass line disposed in parallel with said mixed bed filter, means for purifying said electromagnetic filter and said mixed bed filter independently of each other comprising, for purifying said electromagnetic filter, a closable valve connected in said outlet line and an openable valve connected in said by-pass line and, for purifying said mixed bed filter, an outlet line extending from said mixed bed filter and at least one inlet line connected to said mixed bed filter for supplying a regenerating medium thereto, and valve means connected to said by-pass line and to said outlet line of said mixed bed filter and being selectively actuable, when purifying at least one of said filters, to connect said one of said filters to a waste water preparation installation and, when filtering blowdown water in at least one of said filters, to connect said one of said filters to a cooling water circulatory system.

2. Filter system according to claim 1, wherein a resin catcher is connected in said outlet line of said mixed bed filter.

* * * * *